United States Patent [19]
Zeller

[11] 3,947,010
[45] Mar. 30, 1976

[54] SERVICE CLAMP

[76] Inventor: Miles Zeller, 12861-53 West St., Garden Grove, Calif. 92640

[22] Filed: July 14, 1975

[21] Appl. No.: 595,677

[52] U.S. Cl............................ 269/100; 211/17
[51] Int. Cl.² ............................ B23Q 3/02
[58] Field of Search ............ 269/95–101; 211/17

[56] References Cited
UNITED STATES PATENTS

| 329,406 | 11/1885 | Meadows | 269/101 |
|---|---|---|---|
| 382,590 | 5/1888 | Clay | 269/101 |
| 1,305,321 | 6/1919 | Tooker | 269/99 |
| 1,660,329 | 2/1928 | Fleming | 269/98 |
| 2,019,789 | 11/1935 | Mahannam | 269/97 |
| 3,017,174 | 1/1962 | Reuter | 269/97 |

*Primary Examiner*—Al Lawrence Smith
*Assistant Examiner*—Robert C. Watson

[57] ABSTRACT

A device for use in securing bicycles so that they may be elevated and oriented to any desired position convenient for the repair of said bicycles, the device including means for mounting on suitable support means and means to rigidly hold bicycle frames and for positioning of said frames as desired.

1 Claim, 2 Drawing Figures

SERVICE CLAMP

The present invention is directed to the provision of an improved service clamp to facilitate the repair of bicycles by providing means for securely holding the bicycles in a position which is convenient for repair, the device being provided with means to securely mount it on a suitable support and clamp means to grasp and hold a bicycle frame.

Many clamps or securing devices have been developed from time-to-time for use in supporting bicycles or bicycle frames for repair work. In general, such devices have been adapted for use only in conjunction with fixed support stands, or the like.

This invention relates to the provision of an improved support means adaptable for use in substantially any appropriate environment, but which does not depend solely upon a fixed stand for support.

It is, accordingly, a primary object of the present invention to provide an improved means for use in facilitating repair of bicycles.

Other objects and advantages of the inventive concept set forth herein relate to the provision of an improved support device for use in repair of bicycles wherein the device is readily supported in any convenient support means and which is readily adaptable in support of any bicycle; which is economical to manufacture; easy to use; durable in use and readily adapted for general use in bicycle repair.

The concept which is considered to be characteristic of the invention is set forth in the appended claims. The invention itself along with further objects and advantages will be further understood by reading of the following description taken in connection with the drawings, in which:

Figure 1:
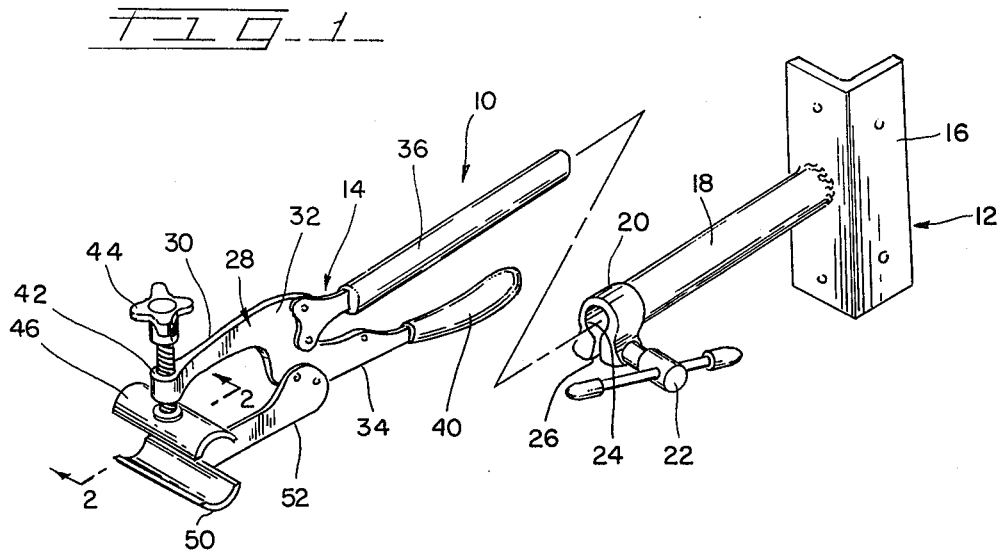
FIG. 1 is an exploded view, in perspective, of the bicycle support means showing the clamp support and bicycle securing means in operative inter-relationship.
Figure 2:
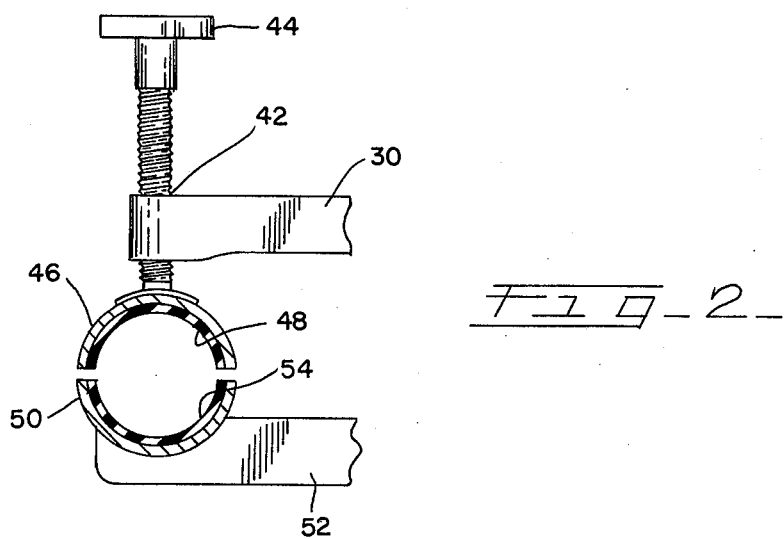
FIG. 2 is an enlarged sectional view of a bicycle clamp means associated with the device.

Referring more particularly now to the drawings, the service clamp is schematically illustrated at 10 in FIG. 1 of the drawings, and includes a base clamp element 12 and bicycle clamp member 14 in the assembly.

The base clamp 12 is schematically illustrated as being defined by an angular support member 16. A base clamp extension rod 18 is rigidly secured to one wall of the support member 16 of the base clamp 12 and terminates upwardly thereof in a free end spaced from the member 16. A collar 20 is mounted on the free terminal of the bar 18, as illustrated in FIG. 1 of the drawings, and is adapted to be selectively controlled by the closure means 22 to control the dimension of the central opening 24 defined by the collar 20. It can readily be seen that as the closure means 22 is rotated clockwise, as viewed in FIG. 1, the gap 26 will be closed and the central opening 24 will effectively be made smaller. As the member 22 is rotated counter-clockwise, as viewed in FIG. 1, the gap 26 will be enlarged and the opening 24 in the collar 20 will also be enlarged. The function of the collar 20 and associated closure means 22 will be defined hereinbelow.

The bicycle clamp means 14 of the assembly 10 is defined by a first, irregular shaped element 28 having a first leg 30 joined to an angularly disposed central portion 32 and extending into a second leg 34. A handle 36 is secured to the central member 32 of the element 28. A second handle element 40 is secured to the leg 34 of the element 28. The handles 36 and 40 are not functional in the sense of defining opening or closing means for the clamp 14 but, rather, are provided as a convenient means for grasping the bicycle clamp 14 for use in positioning the clamp with respect to the frame of a bicycle to be mounted with respect to the clamp 10. An opening 42 is defined in the outer terminal of the leg 30 of the element 28. The opening 42 is threaded to receive the threaded position control member 44 of the assembly. The lower terminal of the position control member 44 is rigidly secured to the upper surface of the clamp segment 46 of the device 10.

The clamp segment 46 is generally arcuate in cross section. The inner surface of the clamp segment 46 is provided with a suitable resilient, protective material 48 so that the clamp segment 46 will not scratch or mar the paint on the bike frame when the clamp segment is secured to the frame.

A lower clamp segment 50 is rigidly mounted to the arm 52, as illustrated in FIG. 1 of the drawings. The other end of the arm 52 is rigidly secured to the central portion 32 and leg 34 of the device 10 so that the arm 52 is rigidly defined with respect to the member 28 of the assembly.

It can readily be seen that when the bike clamp element 14 is placed so that the clamp elements 46 and 50 are disposed about some portion of the tubular bike frame, the bicycle frame will be captured between the clamp elements 46 and 50. It should be noted that the clamp element 50 is also provided with a suitable resilient, protective material 54 so that the protective coating on the bike frame will not be scratched by reason of it being secured between the clamp elements 46 and 50.

When the clamp elements 46 and 50 are placed over the tubular frame of a bicycle, the closure means 44 will be rotated within the threaded opening 42 so that the clamp element 46 will be moved toward the clamp element 50 to securely grasp the tubular bicycle frame element over which the clamp is placed. This will rigidly secure the bicycle clamp 14 with respect to the bicycle frame.

The handle 36 of the bicycle clamp 14 then is placed within the central opening 24 of the collar 20 and extends inwardly of the hollow tube 18 for an appropriate distance to support the weight of the bicycle. The closure member 22 of the collar 20 then is rotated to cause the central opening 24 of the collar 20 to be reduced in dimension and to securely grasp the handle 36 of the bicycle clamp 14 thereby rigidly securing the elements 12 and 14 with respect to each other.

The base clamp member 12 may be supported in a vise or rigidly secured to any other suitable support member for convenience of the user.

The element 14 and the element 12, in combination, define the assembly 10 and are adapted, in combination, to position the bike above the floor for convenience in servicing and repair of the bicycle.

It should be noted also that the bicycle clamp 14 may be rotated with respect to the base clamp element 12 to position the bike in any desired position for convenience in servicing of the bicycle.

While a specific embodiment of the present invention has been shown and described, it will be understood that other modifications may be used without departing from the true spirit and the scope of the invention. I intend by the appended claims to cover all such modifications as fall within their true spirit and scope.

I claim:

1. An improved service clamp for use in the servicing and repair of bicycles, or the like, the clamp comprising:
 a base clamp element adapted to be supported at a pre-determined height above the floor or ground surface and including support means, a rod extending from the support means and a collar operatively associated with the rod to define a selectively determined clamping opening at the rod terminal spaced from the support means for the base clamp element; and
 a bicycle frame clamp element adapted to be supported in and selectively rigidly secured with respect to the base clamp element, the frame clamp including spaced apart, movable, frame clamp elements adapted to be placed about a bicycle frame and means to cause at least one of the clamp elements to be moved with respect to the other to define means for gripping a bicycle frame between the clamp elements, the frame clamp member being further defined by a first irregular shaped element having first and second legs joined by a central member extending therebetween, a first handle joined to the central member, a second handle element joined to the central member and the second leg, a first frame clamp element operatively associated with the first leg of the bicycle frame clamp and a second frame clamp element rigidly secured to the central member and second leg of the irregular shaped element of the frame clamp member, wherein the first frame clamp is movable with respect to the first leg and to the second frame clamp element of the assembly whereby when the first frame clamp element is moved away from the second, an opening is defined therebetween of sufficient magnitude to fit a bicycle frame portion therebetween and when the first frame clamp element is moved toward the second frame clamp element, a clamping action occurs about the bicycle frame portion.

* * * * *